Dec. 30, 1969   J. VLNATY   3,486,880
HEAT INDURATED COMPACTS OF MANGANESE ORE AND
PROCESS OF MAKING SAME
Filed Dec. 7, 1967
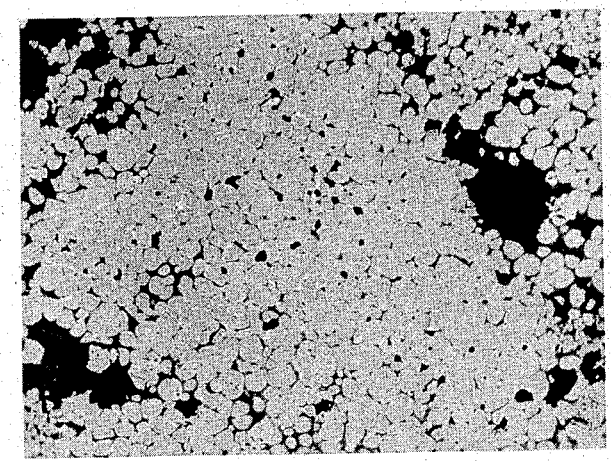
Inventor,
Joseph Vlnaty.
By
Parmelee, Utzler & Welch
Attorneys.

United States Patent Office

3,486,880
Patented Dec. 30, 1969

3,486,880
HEAT INDURATED COMPACTS OF MANGANESE ORE AND PROCESS OF MAKING SAME
Joseph Vlnaty, Aliquippa, Pa., assignor to Dravo Corporation, Pittsburgh, Pa., a corporation of Pennsylvania
Filed Dec. 7, 1967, Ser. No. 688,812
Int. Cl. C21b 1/00, 1/30
U.S. Cl. 75—5                                     10 Claims

ABSTRACT OF THE DISCLOSURE

This application relates to the forming of pellets, briquettes, or other compact bodies from manganese ores and ore concentrates comprising $MnO_2$, $Mn_2O_3$ and $Mn_3O_4$ with which is mixed or associated gangue comprising acid oxides, usually silica, alumina or titania or combinations thereof. Finely divided fossil fuel is mixed with the comminuted or finely divided ore and compacts are formed from the mixture. These compacts are then fired for a period of time in a controlled atmosphere having little or no oxygen, whereby higher oxide at the surface of the ore particles is reduced to MnO which react with acid oxide at the firing temperature of about 2300° F. to form a slag bond together with growth of the grains so that the bodies when cooled are strong and hard. The manganese compacts so formed are of novel construction.

---

This invention relates to forming compacts, such as pellets and briquettes from manganese ores and ore concentrates and to formed bodies or compacts produced thereby, and is for an improvement where preformed compacts can be heat hardened from such ore at temperatures lower than has heretofore been considered practical and without excessive fusing of the compacts together.

It is well known in the steel industry that iron ore or ore concentrates in finely divided form when formed into compacts may be advantageously used both from the standpoint of convenience in handling and the improvement which they provide in a blast furnace stock column, and also from the saving involved in loss of ore as flue dust. Processes and apparatus for pelletizing or otherwise preparing formed agglomerates or compacts of iron ore are well known and in extensive use. They involve generally the shaping of the ore into pellets, or other small preforms, and then firing them to effect heat hardening, largely by a grain growth that takes place at temperatures below that at which the small bodies fuse together but high enough to effect the heat bonding of the ore particles into hard bodies that can be shipped, stored and resist crushing in the blast furnace stock column or other environment to which they are exposed.

While the desirability of forming similar pellets from manganese ore and manganese ore concentrates has been recognized, the usual procedures involved with forming iron ore bodies have not proved commercially feasible with manganese ores. One difficulty is that pellets or other preformed bodies of manganese ore have been hardened by present procedures only at temperatures around 2550° F., which is injurious to the life of the apparatus which is used in firing them and because the pellets stick and fuse together to a serious extent when fired at this temperature. Because of this, the industry has had to resort to the less satisfactory method of heat agglomeration by sintering the ore into masses which are then broken into fragments.

The present invention provides a method by which the ore is preformed as with iron ore as pellets or briquettes and then fired, but wherein the firing temperature is substantially lower than 2550° F. and the sticking or fusing of the formed masses to one another is negligible.

Generally, the process comprises mixing a small amount of finely divided solid fuel with the finely divided ore or ore concentrate, then shaping it into formed bodies and firing the bodies so formed in a controlled atmosphere that is either a reducing or neutral atmosphere, or in some cases contains a limited amount of oxygen. By this procedure the higher oxide, $MnO_2$, $Mn_2O_3$ or $Mn_3O_4$, in the ore is reduced on the surface of the ore particles to MnO which reacts as a base with acid oxide or oxide equivalents in the gangue native to the ore, such as silica ($SiO_2$), alumina ($Al_2O_3$) and titania ($TiO_2$) at a temperature of about 2300° F. (1280° C.) to form lower melting point compounds such as manganese silicate, titanite or other ceramic or slag forming compounds which have a melting range in the general area of 1150° C. to 1250° C. depending on the ore and its accompanying minerals. Under these conditions grain growth is promoted and the slag itself becomes a bonding medium.

In the accompanying drawing the figure is a reproduction of a micro-photograph showing on a magnified scale a section through a portion of a manganese ore briquette produced from the practice of my invention.

In the drawing grain growth of recrystallized partly reduced manganese oxide grains is shown. The manganese oxide grains appear as light grains with the white rims indicating partial reduction of the oxide on the grain surfaces. Pore spaces filled with slag appear as dark gray areas and unfilled pores are black.

As an example, manganese ore from the Amapau mine in Brazil and flue dust was formed into conventional extruded briquettes of about 1 inch in length and about ⅜ inch in diameter. The flue dust, thoroughly mixed through the ore provided about 4% carbon to the mix. About ½% of bentonite was used to increase the green strength of the compacts.

The briquettes were then placed in a laboratory type of indurating furnace and upon reaching a temperature of 2300° F. were fired for ten minutes at that temperature in a non-oxidizing atmosphere comprising about 30% $CO_2$ and 70% $N_2$. Upon cooling the briquettes had an adequate strength for use in shipping, or in a blast furnace stock column or electric furnace, or other conditions to which they would normally be subjected. Their crushing strength was of the order of 800 lbs. per square inch.

Pellets ranging between ⅜ and ⅝ inch in diameter made from the same mix would be similarly fired. The depth of the bed, while not critical with either briquettes or pellets, should not be such as to crush the green compacts at the bottom of the bed. A depth of the order of ten inches was employed, but determination of the maximum depth was not made.

Using the same ore, and an atmosphere containing from 2% to 3% of $O_2$ it was found necessary to increase the amount of carbon in the mix to about 6% in order to maintain reducing conditions within the pellets and to add additional flux forming ingredients, such as sand, alumina and minerals coating either or both. Oxygen in the atmosphere may be controlled at not to exceed 3% by limiting the amount of excess air used for combustion.

Manganese ore is found in widely distributed areas of the earth, and depending on the source of the ore, or the ore concentrates, as the case may be, and the amount and character of the associated gangue, the process may vary from the above example, and some experimentation may be required with specifically different ores or ore concentrates, but in any case, the manganese ore will be one of the higher oxides of manganese, that is, having at least two oxygen atoms, i.e., $MnO_2$, $Mn_2O_3$ and $Mn_3O_4$ and mixtures thereof and will be the primary compound in the ore with the gangue being present in relatively small proportions. In practically all ores, the minimum percentage of carbon, or the carbon equivalent in the form of flue dust, coke, anthracite, bituminous coal or other fossil fuel will be about 4% and the maximum about 6% of the weight of the compact. Also, fluxing materials or gangue contained in the ore will usually be adequate, but as indicated above, when the atmosphere in the indurating apparatus, whether it be a traveling grate machine of the general type shown, for example in the U.S. Patent 3,172,754 or a stack type of furnace, is slightly oxidizing instead of being a reducing or neutral atmosphere, the amount of carbonaceous reducing agent and the percentage of fluxing or slag forming material will be greater.

One skilled in the art, seeking to secure a pellet by the method herein disclosed of mixing finely divided carbonaceous material with the ore or the ore concentrate, with or without added slag forming ingredients, but with an acid oxide from some source present, and firing under reducing conditions, at a temperature of about 2300° F., and in which oxygen may be in a range between 0 and 2% to produce a hardened body, evidenced by a surface on the grains of MnO and a bond of slag with which MnO had combined, will have no difficulty in readily determining the optimum procedure. In most cases, silica and alumina will be the predominant acid oxides but may be present with other minerals. The ore in forming briquettes will generally be coarser, that is, the range size will include larger mesh particles, than where the ore is formed into pellets by the normal process of rolling. Prevailing practice as to compact forming used with other ores, as for example, iron ore, may be followed with manganese ore.

If substantially all of the ore and fuel is 200 mesh or finer, it may be pellitized without any binder, but to impart green strength, both to pellets and pressure formed bodies, around one-half percent of bentonite is desirable.

I claim:
1. The method of forming heat hardened compacts of comminuted manganese oxide ore having at least two oxygen atoms combined with gangue consisting principally of acid oxide, which comprises:
    (a) mixing finely divided fossil fuel with the ore in the proportion ranging between about 4% and 6% carbon equivalent,
    (b) compacting the mix into formed bodies,
    (c) heating the bodies to a temperature of about 2300° F. in a controlled atmosphere in which free oxygen ranges between 0 and 2% until a predominance of manganese ore particles have an oxide film of MnO on the surface thereof and at which temperature MnO will combine with the acidic oxide to form a slag, and
    (d) then cooling the formed bodies.

2. The method defined in claim 1 in which the bodies have a thickness ranging between 3/8 inch and 5/8 inch and the bodies are held at said temperature for about ten minutes.

3. The method defined in claim 1 wherein the acid oxide is selected from the group consisting of silica, alumina and mixtures thereof.

4. The method defined in claim 1 wherein the acid oxide is derived from gangue material indigenous to the ore.

5. The method defined in claim 1 wherein the carbon range is higher where the indurating atmosphere has oxygen present at the higher end of its range.

6. The method defined in claim 1 in which slag forming ingredients naturally contained in the ore are combined with added slag forming ingredients consisting principally of acid oxide.

7. The method defined in claim 1 in which the finely divided fuel is selected from the group consisting of flue dust, coke, anthracite and bituminous coal.

8. The method defined in claim 1 in which the manganese ore is one selected from the group consisting of $MnO_2$, $Mn_3O_4$ and $Mn_2O_3$ and mixtures thereof.

9. A new article of manufacture comprising a preformed heat indurated manganese oxide ore compact in which particles of ore comprised of higher oxides of manganese have a surface film of MnO thereabout and bonded by a slag in which MnO and acid oxide are reacted.

10. A new article of manufacture comprising a preformed heat indurated compact comprised principally of particles of a higher oxide manganese ore bonded at least in part by a slag resulting from the reaction of acid oxide gangue indigenous to the ore and MnO.

References Cited

UNITED STATES PATENTS

| | | | |
|---|---|---|---|
| 1,109,448 | 9/1914 | Messerschmitt | 252—471 |
| 2,961,411 | 11/1960 | Klugh | 75—4 |

OTHER REFERENCES

Torgeson, D. R., et al., "Report of Investigations No. 3917," U.S. Department of the Interior, 1946.

OSCAR R. VERTIZ, Primary Examiner

G. O. PETERS, Assistant Examiner

U.S. Cl. X.R.

75—80